Sept. 20, 1927. 1,642,940
J. BYSTRICKY
LUBRICANT COMPRESSOR
Filed Sept. 25, 1924
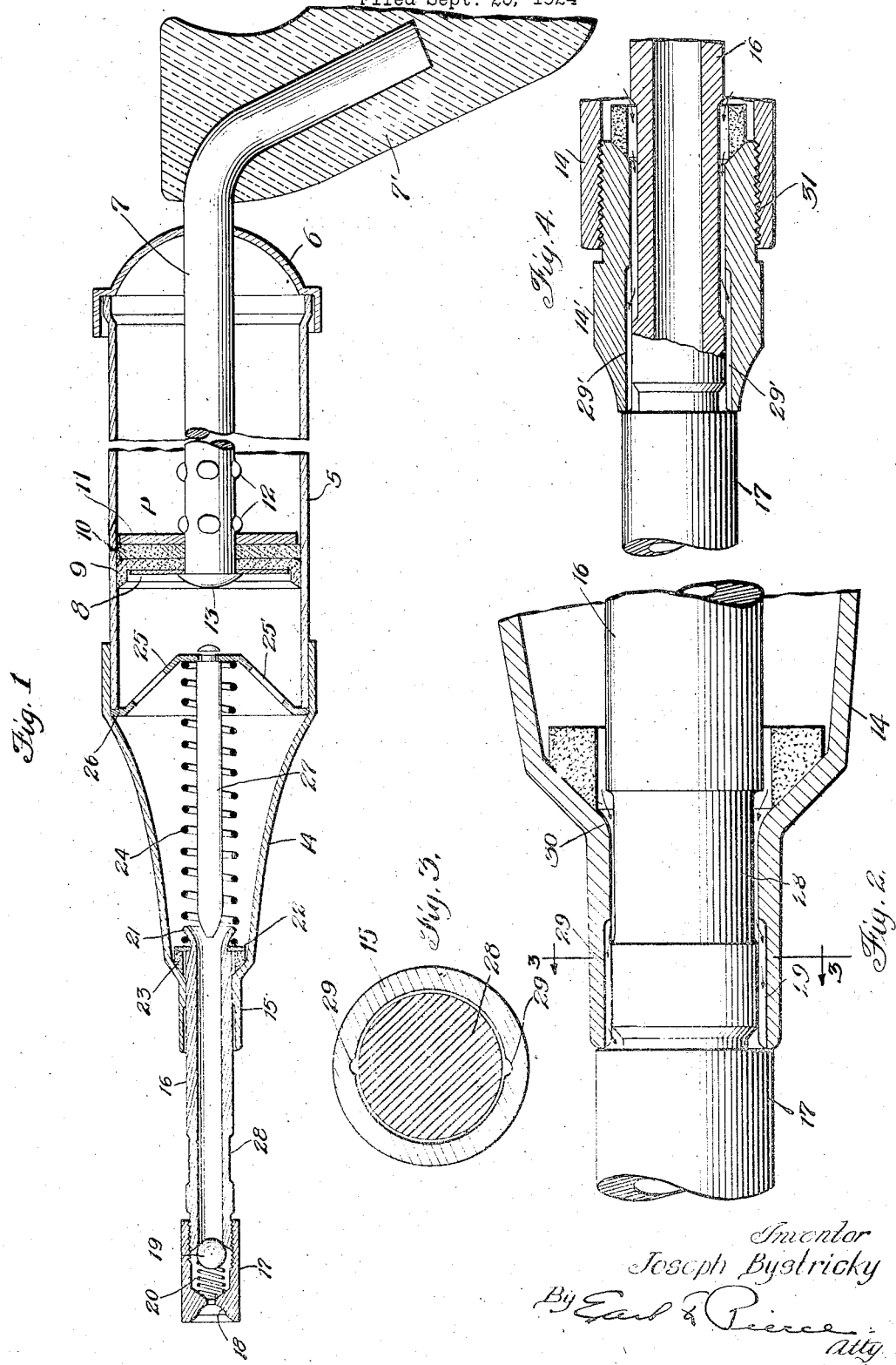
Inventor
Joseph Bystricky
By Earl L. Pierce
Atty Patented Sept. 20, 1927.

1,642,940

UNITED STATES PATENT OFFICE.

JOSEPH BYSTRICKY, OF CLEVELAND, OHIO, ASSIGNOR TO THE ALLYNE-ZERK COMPANY, OF CLEVELAND, OHIO, A CORPORATION OF OHIO.

LUBRICANT COMPRESSOR.

Application filed September 25, 1924. Serial No. 739,844.

My invention relates to improvements in lubricant compressors, and is particularly concerned, though not limited, to improvements in lubricant compressors for supplying lubricant under high pressure to the bearings to be lubricated.

It frequently happens in filling lubricant compressors, that more or less air is entrapped in the lubricant. When pressure is applied to the lubricant, the entrapped air is compressed and frequently interferes with the operation of the compressor. This is particularly true where the lubricant compressor includes a high pressure cylinder of comparatively small displacement. If a comparatively large bubble of air enters a cylinder of this character, it is alternately compressed and then permitted to expand as the plunger moves into and out of the cylinder, and thus prevents the entrance of lubricant into the cylinder. In this manner the compressor is rendered practically inoperative.

One of the objects of my invention is to provide a lubricant compressor having a cylinder and particularly a cylinder adapted to place the lubricant under high pressure with means for preventing the entrapped air from entering the high pressure cylinder.

Another object of my invention is to provide a lubricant compressor having a high pressure cylinder, with means for diverting the air away from the intake of the high pressure cylinder.

A still further object is to provide a compressor such as described, in which means are provided for discharging air from a compressor so as to prevent it from being forced into the high pressure cylinder, the means being such as to prevent leakage of lubricant from the compressor.

A still further object is to provide a compressor of the character described that is simple in construction, economical to manufacture, and easy to operate.

Other objects of my invention will appear as this description progresses, reference being had to the accompanying drawing, in which Figure 1, is a longitudinal section through a compressor embodying my invention.

Figure 2 is a longitudinal section, on an enlarged scale, of a portion of my improved compressor.

Figure 3 is a transverse section taken on line 3—3 of Figure 2, and

Figure 4 is a view similar to Figure 2, showing a modified form of my invention.

Referring to the drawings, and for the time being to Figure 1, my improved compressor comprises a barrel 5, having a removable cap 6 at one end. A piston rod 7 extends through and is reciprocable in the cap 6, and carries at its inner end a piston P comprising a face plate 8, cup-leather 9, the leather washer 10, and the follower plate 11. The follower plate rests against a plurality of projections 12 extending outwardly from the piston rod, and the inner end of the piston rod is riveted over as shown at 13 to engage the face plate 8, and thus hold the parts of the piston in assembled relation.

The opposite end of the barrel 5 is provided with an elongated cap 14 that tapers at its outer end and terminates in a portion 15 of reduced diameter that acts as a bearing or guide-way for the high pressure cylinder 16.

At its outer end the cylinder 16, carries a nozzle 17 having a spherical depression 18 formed therein for co-acting with a fitting to which the lubricant under pressure is to be supplied. The construction of this nozzle and of the fitting for co-acting therewith is clearly disclosed in Patent No. 1,475,980 issued to Oscar U. Zerk, on the 4th day of December, 1923.

A ball closure 19 is held in contact with the outer end of the cylinder 16, by means of a compression spring 20, confined between the ball closure 19 and the end of the nozzle. The inner end of the cylinder 16 is flared as shown at 21 and is provided with a surrounding washer 22, that is adapted to contact with a fiber washer 23, when the cylinder 16 is moved to its outer position under the tension of the spring 24. The spring 24 is confined between the washer 22 and the cup-shaped member 25. The peripheral flange 26, of the member 25 is confined between the adjacent end of the barrel 5, and the tapered portion of the cap 14, as shown in Figure 1.

For displacing the lubricant from the cylinder 16, I provide a plunger 27, one end of which is riveted to the member 25, and the other end of which extends to a position adjacent the open end of the cylinder 21, when the latter is in its extreme outward position.

In using the compressor thus far described, the cap 6, the piston rod 7, and the piston P are first removed from the barrel 5 and the latter is substantially filled with lubricant. The piston P piston rod 7, and cap 6 are then returned. Thereupon, the operator places the nozzle 17 in contact with the fitting that is to receive lubricant and alternately pushes upon the handle 7' connected with the outer end of the piston rod 7, and then releases the pressure thereon. In this manner the plunger 27 is first forced into the cylinder 16 and then withdrawn from the cylinder 16. A substantial vacuum is produced in the cylinder 16 that tends to suck lubricant into the cylinder and at the same time, the piston P tends to move toward the cylinder 16, under a pressure substantially equal to the tension of the spring 24. This causes lubricant to be displaced from the cylinder through openings 25' in the member 25, and the cap 14, into the cylinder 16, thereby filling the latter. When the operator again exerts pressure on the handle 7' toward the cylinder, 16, and toward the fitting that is to receive the lubricant, the plunger 27 moves into the cylinder 16, thereby forcing the lubricant into the latter, past the valve, through the nozzle 17, and into the fittings.

By repeating the process just described, the operator can force as much lubricant as desired into the fittings and can then remove the compressor and repeat this operation with each fitting that is to receive lubricant.

It sometimes happens that in filling a compressor barrel such as the barrel 5, bubbles of air, more or less large, are trapped in the lubricant, and as each bubble of air is forced into the high pressure cylinder 16, it may be simply compressed upon the movement of the plunger 27 in the cylinder 16, and then expand when the plunger 27 is withdrawn from the cylinder 16 so that the only effect accomplished by alternately pushing upon the handle 7' and then releasing the pressure thereon, is to alternately compress and expand the air without forcing lubricant into the fittings.

One of the objects of my present invention is to provide means that will prevent the entrance of air into the cylinder 16, and thus make the action of the compressor more positive. For this purpose I form an annular groove 28 around the cylinder 16, and also cut the longitudinal extending grooves 29 in the inner surface of the bearing or guide-sleeve 15, the annular grooves and the longitudinal grooves being so positioned that when the cylinder 16 is forced into the compressor substantially to its limit, as shown in Fig. 2, the annular grooves 28 and the longitudinally extending grooves 29 will form a continuous passage leading from the compressor barrel, or rather from the cap 14, to atmosphere. The grooves 29 are very small in cross sections, so that while they permit the escape of air from that portion of the cap 14, that surrounds the upper end of the cylinder 16, when the latter is in the position shown in Fig. 1, they will, however, offer sufficient resistance to prevent the escape of any substantial quantity of lubricant.

From the above description it will be apparent that just before the cylinder 16, and the bearing portion 15, of the compressor reaches the position shown in Fig. 2, the air in the lubricant will be subjected to the pressure exerted by the operator upon the handle 7', and the air will, therefore, be compressed so that as soon as the inner edge of the groove 28 clears the shoulder 30, the compressor barrel, this air will be free to expand and pass out of the compressor, through the annular groove 28, and longitudinal groove 29. In this manner, the air is withdrawn from the compressor and from the lubricant therein, at the point where the lubricant enters the cylinder, 16, and will thus prevent air from entering the latter and interfering with the operation of expelling the lubricant.

The construction shown in Fig. 4 is similar to that shown in Figs. 1, 2, and 3, except that here the cap 14 is made in two parts, 14 and 14', that are suitably connected by means of the screw threaded connection and the longitudinal groove 29' is formed in the part 14'.

Otherwise this construction is the same as that disclosed in the preceding figures, and functions in the same manner.

While I have described the details of construction of the preferred embodiment of my invention, it is to be clearly understood that my invention is not limited to these details, but is capable of other adaptations and modifications, within the scope of the appended claims.

Having thus described my invention, what I claim is:

1. A lubricant compressor comprising a barrel, a piston reciprocable in said barrel for placing the lubricant therein under pressure, a cylinder slidably mounted in one end of said barrel and terminating in a nozzle, a spring for yieldably urging said cylinder outwardly, a plunger supported in said barrel for displacing the lubricant from said cylinder when the latter is pushed into said barrel, and means for releasing air from said barrel at a point adjacent the inlet end of said cylinder comprising an annular groove formed in the surface of said cylinder, and a longitudinally extending groove formed in the head of the barrel and positioned jointly to form a passage-way from the adjacent end of the barrel, to atmosphere, when the cylinder is forced into the barrel.

2. A lubricant compressor comprising a barrel, a cylinder slidably mounted in one end of said barrel and terminating in a nozzle, a spring for yieldably urging said cylinder outwardly, a plunger supported in said barrel for displacing the lubricant from said cylinder when the later is pushed into said barrel, and means for releasing air from said barrel at a point adjacent the inlet end of said cylinder, comprising a groove formed in the surface of said cylinder, and a groove formed in the head of the barrel and positioned jointly to form a passageway from the adjacent end of the barrel to atmosphere.

3. A lubricant compressor comprising a barrel, a cylinder communicating with and movable relatively to said barrel and terminating in a nozzle, a plunger for displacing the lubricant from said cylinder, and means for releasing air from said barrel at a point adjacent the inlet end of said cylinder, comprising a groove formed in the surface of said cylinder, and a groove formed in the head of the barrel and positioned jointly to form a passageway from the adjacent end of the barrel to atmosphere.

4. A lubricant compressor comprising a barrel, a cylinder communicating with and movable relatively to said barrel, a plunger for displacing the lubricant from said cylinder, and means for releasing air from said barrel, comprising a groove formed in the surface of said cylinder, and a groove formed in the head of the barrel and positioned jointly to form a passageway from the barrel to atmosphere.

5. A lubricant compressor comprising a barrel, a cylinder communicating with and movable relatively to said barrel, means for displacing the lubricant from said barrel into said cylinder, a plunger carried by said barrel and receivable by said cylinder for displacing the lubricant from the latter, means for yieldingly moving the cylinder away from the plunger, and co-acting passageways formed in said cylinder and in said barrel for discharging air from said barrel when said cylinder and said barrel are in predetermined position relative to each other.

6. A lubricant compressor comprising a barrel, a cylinder communicating with and movable relatively to said barrel, a plunger carried by said barrel and receivable by said cylinder for displacing the lubricant from the latter, and co-acting passageways formed in said cylinder and in said barrel for discharging air from said barrel when said cylinder and said barrel are in predetermined position relative to each other.

7. A lubricant compressor comprising a barrel, for holding a supply of lubricant, a cylinder communicating with said barrel and movable relatively thereto, means for displacing the lubricant from the cylinder, and means for establishing an outlet passageway from said barrel to atmosphere when the cylinder and barrel are in predetermined relative position.

8. A lubricant compressor comprising a barrel for holding a supply of lubricant, a cylinder communicating with said barrel, means for displacing the lubricant from the cylinder, and means actuated by operation of said displacing means for establishing a passageway from said barrel to atmosphere.

9. A lubricant compressor comprising a barrel for holding a supply of lubricant, a piston in said barrel, a cylinder communicating with said barrel, means for expelling lubricant from said cylinder, and means for venting said barrel to atmosphere on the cylinder side of said piston.

10. A lubricant compressor comprising a barrel for holding a supply of lubricant, a cylinder communicating with said barrel, means for expelling lubricant from said cylinder, and means whereby the air is eliminated from the lubricant in said barrel before said lubricant passes into said cylinder.

11. A lubricant compressor comprising low pressure compressing means, high pressure compressing means, said low pressure compressing means delivering lubricant to said high pressure compressing means, and means actuated by operation of said high pressure compressing means for venting air entrapped in the lubricant under low pressure.

12. A lubricant compressor comprising a barrel for holding a supply of lubricant, means for placing said supply under a pressure above that of the atmosphere, high pressure compressing means fed from the low pressure supply in said barrel, and means actuated by operation of said high pressure means for temporarily opening a vent passage from said low pressure supply to atmosphere.

13. A lubricant compressor comprising a barrel for holding a supply of lubricant, means for placing said supply under a pressure above that of the atmosphere, high pressure compressing means fed from the low pressure supply in said barrel, said high pressure means including an element slidable into said barrel and the low pressure lubricant therein, said element and barrel opening a vent passage between the wall of said barrel and the inwardly moving wall of said element during a portion of the stroke of said element.

14. A lubricant compressor comprising a barrel for holding a supply of lubricant, means for placing said supply under a pressure above that of the atmosphere, high pressure compressing means fed from the low pressure supply in said barrel, said high pressure means including an element slidable into said barrel and the low pressure lubricant therein, said element and barrel opening a vent passage between the wall of said barrel and the inwardly moving wall of said element during a portion of the stroke of said element, said vent passage being restricted so that the inward movement of the element wall would push lubricant into said barrel through said passage with a pressure not less than that of said low pressure supply.

15. A lubricant compressor comprising low pressure compressing means, high pressure compressing means, said low pressure compressing means delivering lubricant to said high pressure compressing means, and means for venting air entrapped in the lubricant under low pressure.

In witness whereof, I hereunto subscribe my name this 18 day of September, 1924.

JOSEPH BYSTRICKY